United States Patent [19]

Foroults et al.

[11] 3,721,526

[45] March 20, 1973

[54] INHIBITION OF CORROSION IN HOT CARBONATE CARBON DIOXIDE REMOVAL UNITS

[75] Inventors: Zisis Andrew Foroults, East Orange, N.J.; Brian Eric Hopkinson, Judibana, Estado Falcon, Venezuela

[73] Assignee: Esso Research and Engineering Company, Linden, N.J.

[22] Filed: July 17, 1970

[21] Appl. No.: 55,943

[52] U.S. Cl....................................21/2.7, 423/232
[51] Int. Cl.................................................C23f 11/06
[58] Field of Search.....21/2.5, 2.7; 23/1 A; 423/232, 423/233

[56] References Cited

UNITED STATES PATENTS

| | | | |
|---|---|---|---|
| 1,964,808 | 7/1934 | Bottoms | 23/2 |
| 1,968,722 | 7/1934 | Stone | 53/6 |
| 2,550,997 | 5/1951 | Harden et al. | 134/13 |
| 3,335,096 | 8/1967 | Hatch | 21/2.7 X |

FOREIGN PATENTS OR APPLICATIONS

| | | | |
|---|---|---|---|
| 504,620 | 7/1954 | Canada | 23/1 A |

OTHER PUBLICATIONS

Evans, U. R.; The Corrosion and Oxidation of Metals: Scientific Principles and Practical Applications; Arnold Ltd; London; 1967, pp. 151–152.

Hatch, G. B. (II); "Influence of Inhibitors on the Differential Aeration Attack of Steel; Corrosion; Vol. 21, No. 6; June 1965; pp. 179–187.

Uhlig, H. H.; Corrosion & Corrosion Control: An Introduction to Corrosion Science & Engineering; John Urley & Sons; 1963, N.Y., pp. 231–232.

Wachter, A.; "Sodium Nitrite as Corrosion Inhibitor for Water;" I. & E. C.; Vol. 37, No. 8; August 1945, pp. 749–751.

D. Bienstock et al.; "Corrosion Inhibitors for Hot Carbonate Systems," Corrosion, Vol. 17, pp. 87–90, December 1961.

Primary Examiner—Barry S. Richman
Attorney—Pearlman and Schlager and Louis F. Kreek, Jr.

[57] ABSTRACT

Corrosion of metals and alloys by alkali metal carbonate solutions is greatly reduced by adding to the solution at least about 1.5 percent by weight, and preferably about 2 to 5 percent by weight, of an alkali metal nitrite. Carbon steel is among the alloys which can be protected. Typical solutions are the hot carbonate solutions used to scrub carbon dioxide from gas mixtures.

6 Claims, No Drawings

INHIBITION OF CORROSION IN HOT CARBONATE CARBON DIOXIDE REMOVAL UNITS

BACKGROUND OF THE INVENTION

This invention relates to methods of preventing corrosion of metals by aqueous alkaline solutions, and particularly to methods of preventing corrosion by hot alkali metal carbonate solutions such as those used in the hot carbonate process for removing carbon dioxide from gas mixtures.

The hot carbonate process is a highly efficient process for removing carbon dioxide from gas mixtures, such as ammonia synthesis gas mixtures and hydrogen-carbon dioxide water gas shift mixtures. This process is described, for example, in British Pat. No. 1,063,517. This process employs two towers, i.e., an absorber where $CO_2$ is removed from a gas stream by contact with an alkali metal carbonate solution, usually under pressure; and a regenerator where the absorber effluent solution which is predominantly bicarbonate is regenerated and $CO_2$ is released at lower pressure than that used in the absorber. Usually a concentrated aqueous carbonate solution, e.g., about 25 to about 40 percent by weight $K_2CO_3$, is used. The aqueous alkali metal carbonate solutions as used in this process are highly corrosive to carbon steel and other desirable low cost materials of construction for equipment such as towers and piping.

SUMMARY OF THE INVENTION

According to this invention, corrosion of metals by alkali metal carbonate solutions such as those used in the hot carbonate process is diminished by adding to the solution at least about 1.5 percent by weight, and preferably about 2 to 5 percent by weight, of an alkali metal nitrite.

DESCRIPTION OF THE PREFERRED EMBODIMENT

The salts which have been found to be corrosion inhibitors according to this invention are the alkali metal nitrites. Excellent results have been obtained with sodium nitrite. Similar results are obtained with potassium nitrite and the other alkali metal nitrites.

The concentration of alkali metal nitrite is at least about 1.5 percent by weight according to this invention. Best results are generally obtained when the solution contains about 2 percent to about 5 percent by weight of alkali metal nitrite.

Some further diminution in the corrosivity of hot carbonate solutions can be achieved by aerating the solution with oxygen or air in addition to adding a nitrite as a corrosion inhibitor. Aeration saturates the solution with oxygen. Nitrite concentrations of about 1.5 percent by weight give effective inhibition in aerated solutions but give erratic results in solutions which are not saturated with oxygen.

The inhibitor can be added either as a solid or as a concentrated aqueous solution to the carbonate solution in an amount which will provide the desired concentrations. Such addition is made when a system is started up. Some losses of nitrite may occur and additional nitrite can be added from time to time as necessary to maintain the desired concentration. The addition of inhibitor can be made at any desired location in the system.

The corrosive solutions which are inhibited against corrosion according to this invention are alkali metal carbonate solutions. The carbonate can be any of the alkali metal carbonates such as sodium or potassium carbonate. The alkali metal nitrite inhibitors are effective in both dilute and concentrated carbonate solutions, and are effective over a wide temperature range from the freezing point to the boiling point of the solution.

This invention is particularly useful in inhibiting corrosion caused by hot carbonate solutions used for scrubbing carbon dioxide out of gas streams. Such solutions are aqueous solutions which typically contain approximately 25 to 40 percent by weight of alkali metal carbonate. To this solution is added, according to this invention, at least about 1.5 percent by weight, and preferably about 2 percent to 5 percent by weight of an alkali metal nitrite, e.g., $NaNO_2$ or $KNO_2$. It will be understood that the amounts of carbonate in this solution are merely illustrative, and that the actual amount of carbonate can be greater or less as desired for most efficient carbon dioxide scrubbing. All percentages in compositions described herein are based on the total weight of the composition.

Metals which are protected against corrosion according to this invention are ferrous metals and alloys including carbon steel, stainless steel, chromium steels, nickel steels and other iron-nickel and iron-chromium alloys.

The resistance of carbon steel to corrosive attack by carbonate solutions is greatly improved by the addition of a nitrite inhibitor. This makes it possible to use carbon steel instead of more expensive corrosion resistant alloys in constructing equipment such as towers and piping for a hot carbonate system.

This invention will now be described in greater detail with reference to specific embodiments thereof as illustrated in the following examples.

EXAMPLE 1

A series of test was carried out to determine the effectiveness of sodium nitrite in various concentrations for inhibiting corrosion of carbon steel by hot aqueous potassium carbonate solutions. The following test procedure was used in all tests:

An aqueous solution containing 40% by weight of potassium carbonate and a quantity of sodium nitrite as indicated in Table I below was charged to a 2,000 ml. flask having a bubbler tube for carbon dioxide, a vent opening, and a glass rack supporting two 1020 carbon steel test coupons. The solution was heated on an electric heating mantle to 210° F. and maintained at this temperature throughout the test. The duration of tests was from 4 to 6 days. Carbon dioxide was continuously bubbled in beneath the solution surface, so that the test solution was saturated with $CO_2$ before and after each test.

The test specimens were prepared for use by polishing with emery paper, pickling in boiling 10 percent sulfuric acid, rinsing in water, drying in a dessicator, and weighing. Each specimen was weighed again at the end of the test and the corrosion rate was determined from the weight loss.

The effectiveness of the sodium nitrite corrosion inhibitor is indicated by inhibitor efficiency, which is the difference between the corrosion rate in the test solution and the rate in the blank solution divided by the latter. In other words:

$$\text{percent Efficiency} = (I_o - I)/I_o \times 100$$

where $I_o$ is the corrosion rate in the blank solution and $I$ is the corrosion rate in the test solution.

Results are given in Table I below. In this table, the corrosion rates for each test specimen are given separately, but inhibitor efficiency results are based on the average of the two specimens in each test.

TABLE I

Corrosion of 1020 carbon steel in 40 % aqueous $K_2CO_3$ solution saturated with $CO_2$ at 210°F.

| Run | $NaNO_2$ Concentration, Weight % | Solution pH Before | Solution pH After | Corrosion rate, mils/year | Inhibitor efficiency, Percent |
|---|---|---|---|---|---|
| Blank | -- | 12.4 | 10.8 | 93 / 95 | 0 |
| 1 | 0.5 | 12.4 | 9.8 | 104 / 162 | * |
| 2 | 1.0 | 12.4 | 9.8 | 188 / 175 | * |
| 3 | 1.5 | 12.4 | 9.7 | 254 / 1.1 | ** |
| 4 | 1.5 | 12.4 | 9.7 | 32 / 33 | 64 |
| 5 | 2.0 | 12.4 | 9.6 | 9.5 / 11.4 | 88.8 |
| 6 | 2.5 | 12.4 | 9.8 | 1.9 / 19.6 | 88.5 |
| 7 | 5 | 12.4 | 9.8 | 14 / 2.2 | 91.4 |

\* Negative efficiency; worse than the blank run.
\*\* Statistically valid average cannot be obtained on these data.

Concentrations of sodium nitrite less than 1.5 percent by weight are ineffective for corrosion inhibition under the conditions of the above tests, as the data shown. Results at 1.5 percent by weight of sodium nitrite are erratic. The widely differing corrosion rates of the two test specimens in Run 3 is an indication of metastable passivation conditions prevailing near the critical minimum inhibitor concentration for effective inhibition. Effective inhibition, however, is obtained under these conditions using 2 percent or more by weight of sodium nitrite, as illustrated in Runs 5, 6 and 7.

EXAMPLE 2

The procedure and apparatus were the same as in Example 1 except that the flask in this example had an air bubbler in addition to the carbon dioxide bubbler. Air was bubbled into the the solution at the rate of 46 cc/min. in order to saturate the solution with air. Results are given in Table II below.

TABLE II

Corrosion of 1020 carbon steel in 40% aqueous $K_2CO_3$ solution saturated with $CO_2$ at 210°F.; air bubbled in at 46 cc/min.

| Run | $NaNO_2$ Concentration, Weight % | Solution pH Before | Solution pH After | Corrosion rate, mils/year | Inhibitor efficiency, Percent |
|---|---|---|---|---|---|
| 8 | 1.5 | 12.6 | 9.9 | 1.1 / 1.4 | 98.7 |
| 9 | 2.5 | 12.6 | 9.7 | 13.8 / 1.75 | 91.7 |

Comparison of the data in this example with those of Example 1 shows that more effective corrosion inhibition is obtained in a solution saturated with air than in a solution having the same inhibitor concentration which is not saturated with air.

What is claimed is:

1. A method for inhibiting corrosion of ferrous metal or alloy by a hot aqueous scrubbing solution containing at least about 25% by weight of an alkali metal carbonate in a hot carbonate system comprising an absorber in which $CO_2$ is removed from gases and a regenerator where $CO_2$ is released, which comprises adding to said scrubbing solution at least about 1.5% by weight of an alkali metal nitrite.

2. A method according to claim 1 in which said ferrous metal or alloy is carbon steel.

3. A method according to claim 1 in which said aqueous solution contains dissolved carbon dioxide.

4. A method according to claim 1 in which said nitrite is potassium nitrite.

5. A method according to claim 1 in which the concentration of alkali metal nitrite is from about 2 to about 5 percent by weight.

6. A method according to claim 1 in which the solution is saturated with air.

* * * * *